United States Patent [19]
McNeal

[11] 3,880,194
[45] Apr. 29, 1975

[54] ELECTRICAL INSULATORS
[75] Inventor: Walter P. McNeal, Holland, Mich.
[73] Assignee: General Electric Company, Fort Wayne, Ind.
[22] Filed: Feb. 20, 1973
[21] Appl. No.: 333,786

[52] U.S. Cl. ............ 138/128; 138/148; 174/110 N; 174/117 R
[51] Int. Cl. .......................... F16l 11/12; H01b 7/00
[58] Field of Search ........... 138/140, 141, 142, 151, 138/156, 157, 171, 128, DIG. 7, 148–149; 174/137 R, 110 N, 120 R, 72 A, 110 PM:120 SR; 161/145, 148

[56] References Cited
UNITED STATES PATENTS

| | | | |
|---|---|---|---|
| 2,176,109 | 10/1939 | Ratay | 138/128 X |
| 2,260,064 | 10/1941 | Stokes | 156/203 X |
| 2,408,253 | 9/1946 | Diebold | 138/128 X |
| 2,761,525 | 9/1956 | Moss | 138/149 X |
| 3,071,214 | 1/1963 | Steinbichler | 138/171 X |
| 3,312,250 | 4/1967 | Sirignano et al. | 138/171 X |
| 3,440,118 | 4/1969 | Obeda | 174/72 A |
| 3,575,623 | 4/1971 | Stine | 310/260 |
| 3,629,489 | 12/1971 | Jachimowicz et al. | 174/110 PM X |

OTHER PUBLICATIONS
T884,008; 3-1971; Gumerman
Publication by Dupont, "Properties . . . of Nomex," Bulletin N-195, September, 1965.

*Primary Examiner*—Richard C. Queisser
*Assistant Examiner*—Daniel M. Yasich
*Attorney, Agent, or Firm*—Ralph E. Krisher, Jr.

[57] ABSTRACT

Electrical insulators are formed from insulative strip material by providing a substantially continuous ultrasonically welded seam. In one embodiment a tubular insulator for covering stator winding connections is formed by continuously moving the strip and a strip of dissimilar material about a cylindrical former having its axis in generally the same direction as the direction of elongation and motion of the strips to thereby form a multiple layer sleeve with a seam being ultrasonically formed to include the two edges of the strip of polyester material.

6 Claims, 10 Drawing Figures

ELECTRICAL INSULATORS

CROSS REFERENCE TO RELATED APPLICATIONS

My application Ser. No. 192,204, filed Oct. 26, 1971 (now U.S. Pat. No. 3,748,510 issued July 24, 1973) and assigned to the assignee of this application is a related application, and the entire disclosure of said copending application is incorporated herein by reference.

BACKGROUND OF THE INVENTION

The present invention relates to a new and improved insulator for use in dynamoelectric machine stator assemblies.

The manufacture of dynamoelectric machines has developed into a highly sophisticated industry. In the manufacture of wound stators for such machines, coils may be wound on a coil form and then inserted into the stator; or the wire for forming such coils may be directly dispensed into the stator slots in a so-called "in-slot" winding process. In either approach various insulators are employed in addition to the typical ground insulation that is immediately adjacent to coil accommodating surfaces of the core. For example, an examplary stator slot may have a cuffed stator slot wedge or slot liner such as illustrated in U.S. Pat. No. 2,935,859 inserted therein before any wire is deposited in that slot, although slot insulation may also take the form of an epoxy or other resinous coating. With the slot liner in place, a first phase winding may then be inserted in the slot to be followed by a phase insulating wedge or separater. Next, a second winding is inserted in this slot and, lastly, an insulating wedge is inserted in the slot. In this example, where two different phase windings occupy the same slot, it is also desirable to provide additional insulation between the end turns of the two different phases. This additional end turn insulation is sometimes called "window" insulation in the art, and an example of such an approach is shown in U.S. Pat. No. 2,701,317, which was assigned to the assignee of this application. There may also occur connections between different pole windings of the stator and connections from such windings to the stator leads. To insulate such connections, there may be provided additional insulators often in the form of insulators or sleeves such as those disclosed in U.S. Pat. No. 3,219,857 (which is assigned to the assignee of this application), which fit over the interconnected wires and to either side of a particular point of connection. Since these interpole or external lead connections are often soldered, sharp protrusions may be present, and the tubular insulators should be particularly rugged. Stator insulators have at one time or another been manufactured of paper and also of polyester materials, such as polyethylene terephthalate which may be purchased under the trade name "Mylar" polyester. The polyester materials have proven to be particularly desirable materials because of their strength, good electrical insulating properties, and compatibility with lubricants and refrigerants normally encountered in hermetically sealed refrigeration compressor motor parts.

In a hermetically sealed compressor environment, quality of insulation is particularly important since such insulation comes in contact with refrigerant and lubricants employed in the refrigeration system and any insulation failure may result in loss of not only the motor but an entire compressor unit. Any moisture which might be present in the insulators at the time of assembly could of course lead to system damage if that moisture were to subsequently freeze and block the refrigerant circulation path. Because of these considerations such insulators are now almost universally fabricated from synthetic materials, of which polyethylene terephthalate or Mylar polyester will be taken as exemplary throughout the present specification.

While polyethylene terephthalate is particularly suited to the hermetic motor environment, it can be difficult material to work with and is rather costly. Heating this material in an attempt to bind two pieces of polyester sheet material together results in a thermal degradation of the material which not only weakens the material but also changes its chemical properties somewhat so that the material may be more prone to absorb moisture. Also, if it is overly heated refrigerants such as Freon may later cause a molecular particle to leave the insulator and contaminate the freon base refrigerant. Attempts have been made to bond two sheets of polyethylene terephthalate together by ultrasonic spot welding techniques. However, such welds are not characterized by great strength, and I have found that ultrasonic welding of such material is so detrimental to the ultrasonic welding tips that such tips would rapidly wear away and require replacement. Adhesive or solvent bonding of polyester to polyester is expensive, does not result in particularly strong bonds, and introduces undesirable materials which again may be detrimental in a refrigerant compressor environment.

Present production techniques of, for example, phase insulators is to cut the insulator from a flat sheet of material and discard almost as much material as is retained for the end turn or phase insulator. The cost of discarding such a substantial quantity of insulating material is of course substantial.

It is accordingly a general object of the present invention to overcome one or more of the foregoing problems.

It is another object of the present invention to provide new and improved electrical insulators from strip insulating material.

A further object of the present invention is to provide a new and improved connection insulator for interpole and winding lead connections in dynamoelectric machines.

Still another object of the present invention is to join polyester materials together without degrading the materials.

A yet further object of the present invention is to effect a substantially continuous polyester material to polyester material ultrasonically welded seam.

It has been recognized in the art that ultrasonic welder tip wear is a substantial problem, and particularly so in connection with welding polyester materials such as polyethylene terephthalate. In fact, the industry makes use of exotic welder tip materials such as titanium alloys, in an effort to reduce welder tip wear. Attempts to harden the tip or portion of the machinery which transmits the ultrasonic vibrations to the material being processed have not been successful, since hardening the vibration transmitting material would substantially diminish its vibration transmitting capabilities. In addition, hard or brittle materials would rupture, crack or break when driven with sufficient energy to ultrasonically weld a work piece.

SUMMARY OF THE INVENTION

In carrying out the above and other objects in preferred embodiments, I provide a system for the production of polyester insulators that may be used in motor parts for hermetically sealed compressor applications. The insulators are used to cover winding connections. The insulators comprise generally tubular laminated electrical insulating sleeves having two wall areas which are, for example, three layers thick. The insulator includes a section along which a continuous weld seam is formed. In one three layer area, a material such as Du Pont's Nomex polyamide insulating material is sandwiched between two sheets or layers of a polyester material such as Du Pont's Mylar polyester material. An exemplary three layered insulator may comprise one sheet of Mylar material and one sheet of Nomex material, but formed about a cylindrical rod so that the Mylar sheet is wrapped upon itself and overlapped so that a polyester to polyester to polyester ultrasonic bond may be established and thus also form a three layer area.

BRIEF DESCRIPTION OF THE DRAWING

The aforementioned and other objects, features, and advantages of the present invention will become more apparent from the following detailed description thereof when considered in conjunction with the drawing wherein.

DESCRIPTION OF THE PREFERRED EMBODIMENT

Figure 1:
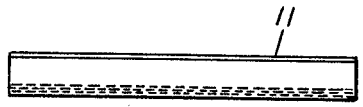
FIG. 1 is a side view of a winding connection insulator embodying the present invention in one form.
Figure 2:
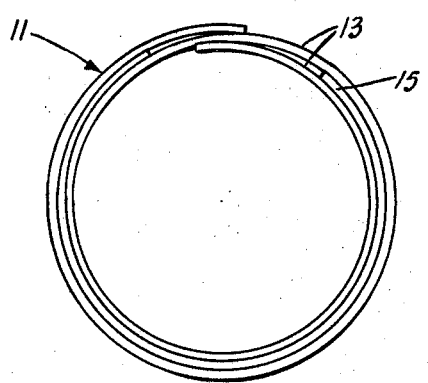
FIG. 2 is an end view of the insulator of FIG. 1 after forming and prior to ultrasonic welding.

The structure of the insulator 11 of FIGS. 1 through 5 is most easily understood beginning with FIG. 2 which shows an end view of that insulator 11 after it is formed but before being ultrasonically welded. The insulator comprises a strip 13 of polyester material (e.g., Mylar) which is wrapped about itself into a cylindrical form and of a diameter so as to complete slightly more than two complete revolutions. This allows the two edges of the strip 13 to overlap for subsequent welding. Before forming the strip in this manner a second strip 15 of a dissimilar material such as the Nomex material is superimposed on the strip 13 so that in the forming process the Mylar makes at least 1 complete revolution about a former so as to prevent the strip 15 from coming into contact with the former. The Mylar and Nomex (both of which names are registered trademarks of E. I. du Pont de Nemours and Company) strips are continuously fed to a former so as to continuously create a tubular structure having a cross section like that illustrated in FIG. 2. As is well known to persons of ordinary skill in the art, Nomex strip (or sheet) material is a high temperature-resistant nylon paper that is a polyamide material.

Figure 3:
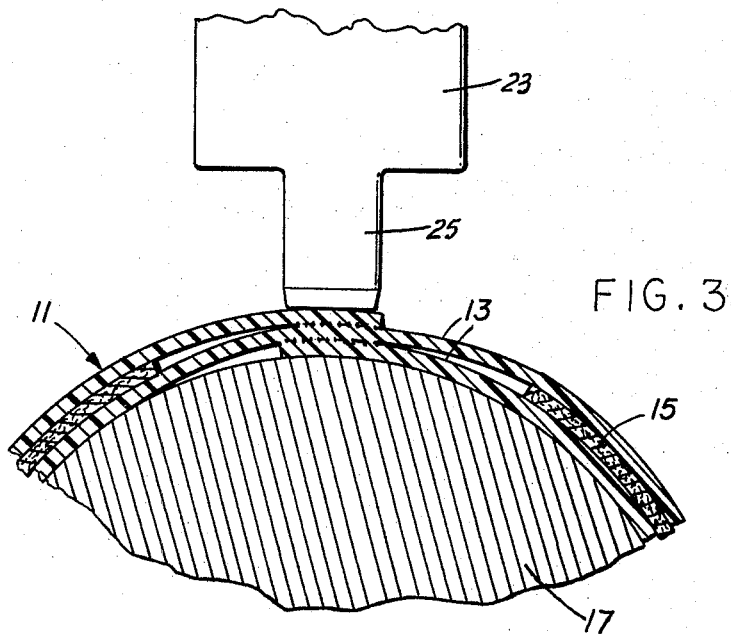
FIG. 3 illustrates the ultrasonic welding or bonding of a continuous seam on the insulator of FIG. 1.

The former itself may comprise a cylindrical rod 17 as shown partially in cross section in FIG. 3. The width of the strip 13 is somewhat greater than twice the girth of the cylindrical rod 17 so that the strip 13 will wrap about the rod 17 somewhat more than twice, and the width of the strip 15 is somewhat less than the girth (or circumference) of rod 17. The strip 15 is asymmetrically placed on the polyester strip 13 so that material 13 is exposed along one side thereof, and such exposed side is started about the rod 17 so that the configuration of FIG. 2 will result. The process of forming the continuously fed superimposed strips 13 and 15 into the configuration illustrated in FIG. 2 is accomplished by the former 19 of FIG. 5, and is not set out in further detail here, since it is not necessary to an understanding of the present invention. Once the material is formed into the configuration shown in FIG. 2, that portion of its periphery having three adjacent layers of strip 13 is passed under the welding head 21 of FIG. 5. As the laminated tube 11 passes under welding head 21, it is still wrapped about the cylindrical rod 17 which functions to support the material under the welding head 21. The rod 17 may be supported within the former 19 in cantilever fashion and may be counterbalanced for example, so to force the polyester material upwardly toward the welding head 21. Alternatively, the rod 17 may be fixed in cantilever fashion and the welding head 21 biased toward rod 17 so as to exert pressure on the three layers of strip 13 between the welding tip and rod 17. The welding head itself is seen in greater detail in FIG. 3 and may comprise a vibration transmitting portion or shank 23; and a tip 25. These two portions may be formed as integral members or the tip 25 may be formed as a separate replaceable portion. The tip 25 is caused to vibrate at an ultrasonic rate by standard ultrasonic welding techniques.

For example, the welding device may have a power supply for providing electrical energy, means for converting the electrical energy into mechanic energy, and means for transferring the mechanical energy by way of the vibration transmitting portion 23 to the tip 25. The tip 25 is continuously ultrasonically energized and the sheets 13 and 15 are continuously moved past the tip 25 so as to provide a continuous seam or bond between the three layers of polyester material 13. The ultrasonic vibrations cause motion between the polyester layers, thus inducing frictional heat along their surfaces sufficient to fuse the materials together in the area of the weld without, however, heating the material 13 to a point where thermal degradation takes place.

As noted earlier, the welding tips used in the ultrasonic welding of polyester materials experience excessive wear. I can now overcome that problem by making the tip 25 of cold rolled or cold drawn steel and then case hardening at least the work engaging portion thereof. This case hardening (or other suitable surface hardening) of the welding tip does not substantially diminish its vibration transmitting characteristics, but does provide an extremely hard surface that is not readily worn away as strip 13 is moved therepast.

Figure 4:
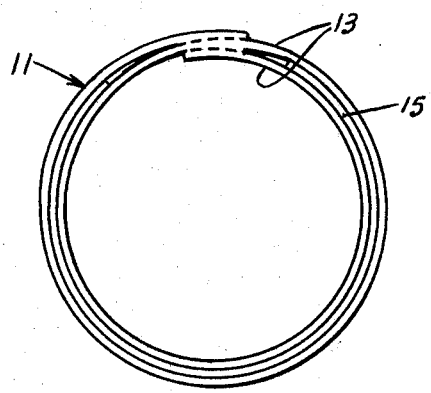
FIG. 4 is an end view like FIG. 2 but after the welding process has been performed.
Figure 5:
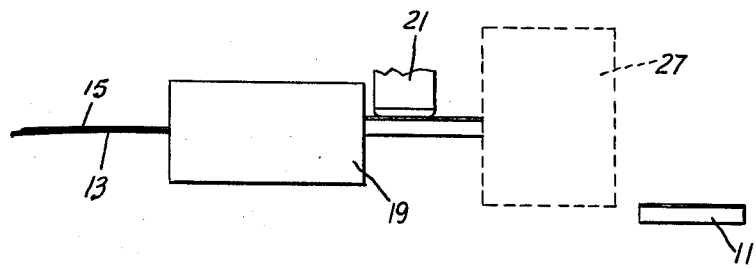
FIG. 5 illustrates an overall method of forming the insulator of FIG. 1.

As the material of tube 11 passes beyond the welding head 21 of FIG. 5, it has the configuration illustrated in FIG. 4, where dotted lines illustrate the weld regions between the three layers of material 13. As seen in FIG. 4 the tube 11 is formed as a generally tubular, laminated, electrical insulating sleeve having two wall areas which are three layers thick. However, it should be clear that the process of forming these materials about the cylindrical rod 17 could for example, include several more revolutions of the polyester material about the rod and could include additional Nomex layers as well.

With reference again to FIG. 5, after welding, the tube continues to a station indicated generally as 27 where it is periodically severed so as to form the individual insulators 11. In one preferred embodiment, interpole and winding lead connection insulators for hermetically sealed refrigeration units were manufacture in accordance with the present invention employing a cylindrical rod 17 having a one quarter inch diameter. The Mylar-Nomex-Mylar insulating sleeves produced were about nine thirty-seconds of an inch in diameter. The Mylar was about 0.003 to 0.005 inches thick and 1⅞ inches wide; while the Nomex was 0.003 inches thick and three-fourths of an inch wide. Both materials were fed to station 19 from reels of strip material. The severing device 27 was actuated at a rate such as to produce insulators 11 having an axial length of slightly over 2 inches.

Figure 6:
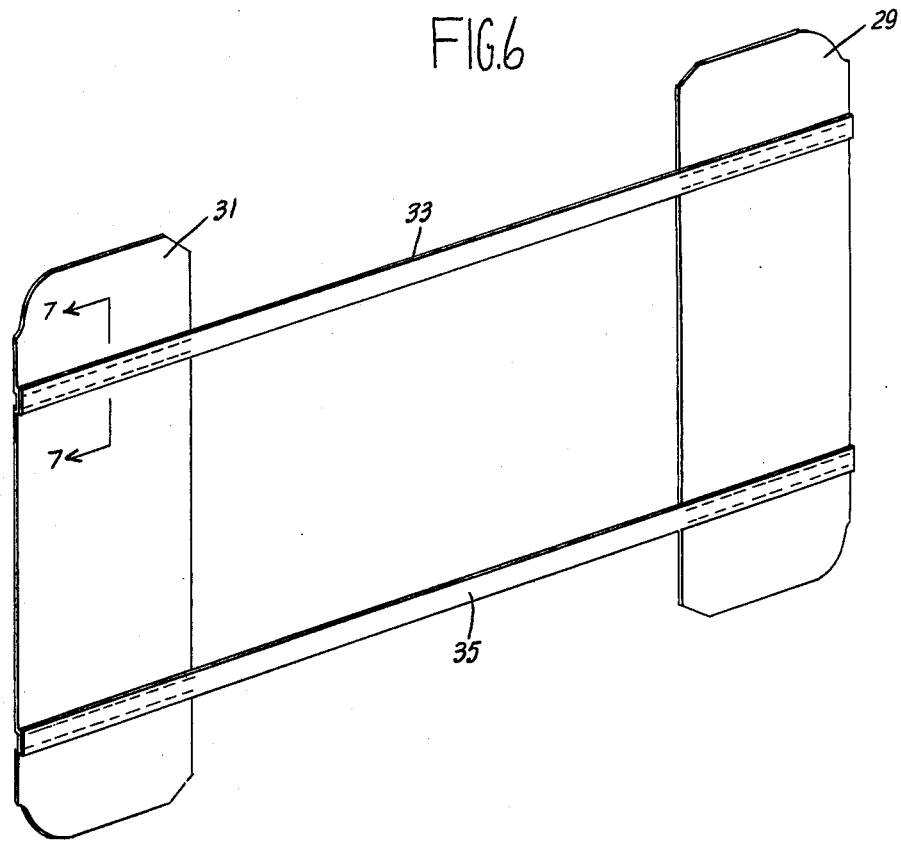
FIG. 6 is a perspective view of a fabricated phase insulator.

Insulators of the same general configuration as that illustrated in perspective in FIG. 6 are employed in dynamoelectric machine stators where the end portions 29 and 31 function to separate the end turns of different winding phases. The connecting portions 33 and 35 pass along a pair of stator slots between the end faces of the stator core. The width of the connecting portions 33 and 35 must be such that they will fit within stator slots and the distance between the two end portions 29 and 31 should be slightly greater than the axial length of the stator in which the insulator of FIG. 6 is to be used.

Insulators as generally illustrated in FIG. 6 have been made heretofore by relatively expensive processes. For example, an entire insulator has been cut from a single wide strip of polyester material in which case the window between end portions 29 and 31, and between the connecting portions 33 and 35 would represent a large and expensive piece of scrap. Of course, smaller scrap portions from the area outside the two connecting portions 33, 35 would also result.

Polyester material is relatively expensive, and discarding such a large percentage of the material as scrap leads to relatively expensive end turn insulators. In an attempt to eliminate this costly scrap, two narrow strips of polyester material have been provided with two end portions spot-welded thereto. However spot-welds lack adequate strength and may break free during the stator assembly process resulting in a rejected stator. The new and improved end turn insulator of FIG. 6 is now made possible by an economical and reliable process illustrated in FIG. 8, which process is somewhat analogous to the process presented by FIG. 5.

Figure 8:
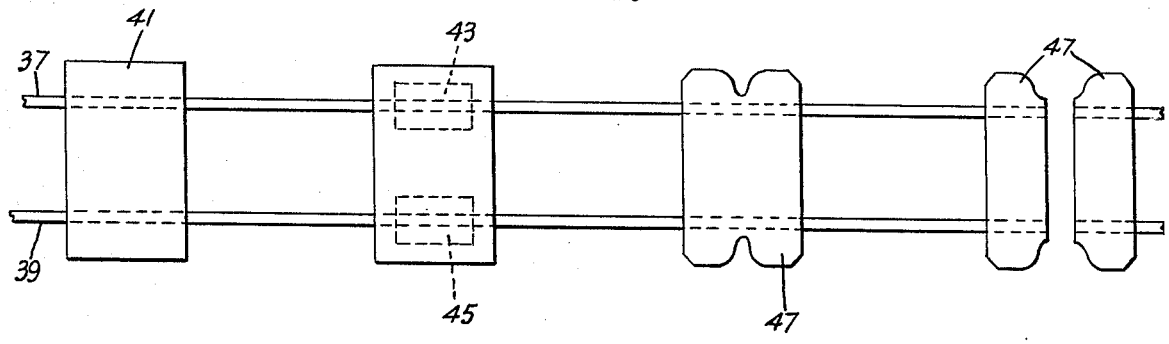
FIG. 8 illustrates a method of fabricating the insulator of FIG. 6.

In FIG. 8, a plurality (such as two) of parallel elongated narrow flat strips of polyester material 37 and 39 are continuously fed toward the right in FIG. 8 from a pair of reels of such material. Alternately, material may be fed from a single reel across means for splitting the single strip into the two strips 37 and 39.

A plurality of flat sheets 41 of polyester material are then disposed along the parallel strips 37, 39 (for example, by feeding wide strip material in a direction perpendicular to that of the narrow strips and periodically severing such wide strip to deposit a flat sheet 41 on the two narrow strips). The discrete pieces 41 and strips 37, 39 pass under a pair of ultrasonic welding heads illustrated in dotted lines as 43 and 45. These ultrasonic welding heads form a continuous ultrasonic weld and secure the discrete pieces 41 to the pair of narrow strips 37, 39; thus forming a ladder-like strip of relatively flat electrical insulators. These insulators may subsequently be cut or blanked out to the form illustrated at 47. Thereafter, pieces 47 are severed along a line substantially perpendicular to the direction of travel of the strips 37 and 39, so that a single discrete piece such as piece 41 ultimately forms one end portion 29 of one insulator; and the other end portion 31 of another insulator.

The ultrasonic welding heads 43 and 45 join each flat sheet 41 to the strips 37 and 39 along a substantially continuous seam running generally in the direction of elongation of the strips 37 and 39. Welding head 45 (it being noted that head 43 is the same as head 45) is better illustrated in FIGS. 9 and 10.

Figure 10:
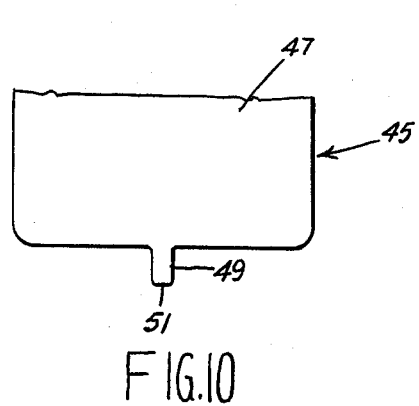
FIG. 10 is an end view of the ultrasonic welding tip shown in FIG. 9.
Figure 9:
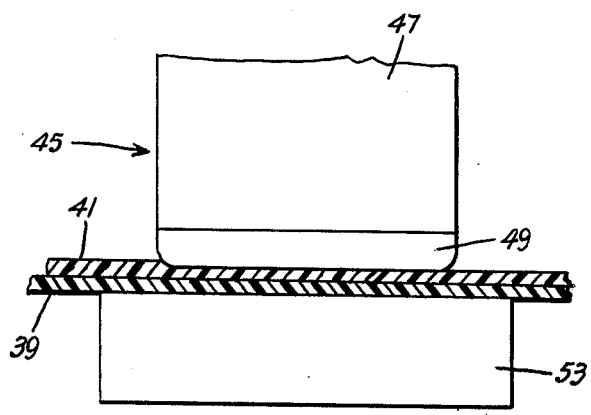
FIG. 9 illustrates the continuous ultrasonic welding step of FIG. 8.

FIG. 10 illustrates the welding head 45 looking in the direction of elongation of the strips 37 and 39. Welding head 45 comprises a vibration transmitting portion 47, and a tip portion 49. The tip portion 49 has a work piece engaging surface 51 which, as illustrated in FIG. 9, cooperates with a support member 53. The support member and work piece engaging surface 51 are biased toward one another in known fashion, with the two superposed pieces of polyester material 39 and 41 therebetween. The vibration transmitting portion 47 transmits ultrasonic vibrations to the work piece engaging surface 51. This in turn induces a weld along the interface of layers 39 and 41. At least the work piece engaging surface 51 is surface hardened to prevent excessive wear due to the continuous nature of the weld. However, the vibration transmission characteristics of the tip are not adversely affected. Moreover, cracking of hardened tip surfaces has not been experienced.

Figure 7:
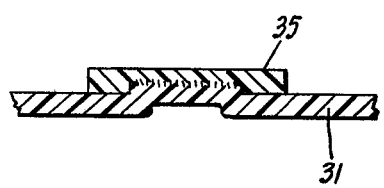
FIG. 7 is a sectional view along the line 7—7 of the insulator of FIG. 6 illustrating the fused bond thereof.

As seen in FIGS. 7 and 9, the ultrasonic welding process causes a slight diminution in thickness of the joined materials. The typical polyethylene terephthalate insulating strips employed to make the insulator of FIG. 6 were about 0.003 inches thick, but the resulting thickness of a typical weld region was only about 0.004 inches thick. However, this 0.002 inch loss of total two layer thickness does not impair the insulating qualities of the resulting product.

The art of sonically or ultrasonically welding has previously been developed and is represented, for example, by patents that are assigned to Branson Instruments, Incorporated, of Stamford, Conn. Some of the Branson owned patents, the disclosures of which are incorporated herein by reference, are U.S. Pat. Nos. 3,224,916; 3,367,809; and 3,499,808. As previously stated, common materials (e.g. cold drawn or cold rolled steel) may be used for welding tips after it has been case hardened. The exact degree of hardness of the tip is not critical, so for teaching purposes only, it is noted that the tools herein shown had a surface hardness of about 65, Rockwell C scale; and were case hardened to a depth of about 0.021 of an inch. These tools, when energized at 20,000 hertz, did not crack and did not show evidence of wear when strips 37, 39, and 41 (of FIG. 8) were 0.0075 of an inch thick Mylar; and when strip 13 (FIGS. 2 and 4) was made of different thicknesses (e.g., 0.003, 0.005, and 0.010 of an inch thick) Mylar; even though the tips 21 and 49 were continually energized during formation of insulators embodying the invention as described above.

While the present invention has been described with respect to preferred embodiments thereof, numerous modifications will suggest themselves to those of ordinary skill in the art. Accordingly the scope of the present invention is to be measured only by that of the appended claims.

What I claim as new and desire to secure by Letters Patent of the U.S. is:

1. A generally tubular multi-layer electrical insulator for accommodating electrically connected portions of at least two electrical conductors comprising a dielectric sleeve having first and second wall areas which are at least three layers thick, said first and second wall areas being separated by two other wall areas which are at least two layers thick and at least one less layer thick than the number of layers in the first and second wall areas, whereby a dielectric insulator is formed having a minimum of three layers of thickness along the second wall area and establishing a major portion of the circumferential extent of the insulator to better resist puncture by connected portions of electrical conductors, said sleeve having a longitudinally extending ultrasonically welded continuous seam along the first wall area.

2. The insulator of claim 1 wherein the layers in the first wall area of the sleeve are thermally bonded together.

3. The insulator of claim 1 wherein the outer and inner layers in the second wall area of the insulator are of a first given insulating material and the middle layer is of a given insulating material different than the first given insulating material.

4. The insulator of claim 3 wherein the first wall area of the insulator has all three layers formed of the frist given insulating material and the interfaces of the three layers are bonded together.

5. The insulator of claim 4 wherein the first given insulating material comprises a single sheet of polyethylene terephthalate and the middle layer of insulating material comprises a single sheet of material other than polyethylene terephthalate.

6. A fabricated electrical insulator for accommodating electrically connected portions of at least two electrical conductors formed from at least one sheet of dielectric material and having at least one portion thereof defined by at least three layers of dielectric material; said at least one sheet being rolled upon itself into a tubular configuration so that the at least three layers of the sheet material are superposed, one upon another; said at least three layers being bonded together along the interfaces thereof along a longitudinally extending ultrasonically welded continuous seam; said tubular configuration electrical insulator including a second piece of insulating material sandwiched between two layers of said sheet material and extending continuously from one side of the ultrasonically welded seam around the insulator to the other side of the ultrasonically welded seam.

* * * * *